United States Patent
Eckert et al.

(10) Patent No.: US 10,641,310 B2
(45) Date of Patent: May 5, 2020

(54) SCREW HAVING DISCONTINUOUS SCRAPING EDGES

(71) Applicant: Adolf Würth GmbH & Co.KG, Künzelsau (DE)

(72) Inventors: Rainer Eckert, Weikersheim (DE); Andreas Wunderlich, Kupferzell (DE)

(73) Assignee: WÜRTH INTERNATIONAL AG

( * ) Notice: Subject to any disclaimer, the term of this patent is extended or adjusted under 35 U.S.C. 154(b) by 60 days.

(21) Appl. No.: 15/573,469

(22) PCT Filed: May 3, 2016

(86) PCT No.: PCT/EP2016/059816
§ 371 (c)(1),
(2) Date: Nov. 14, 2017

(87) PCT Pub. No.: WO2016/180661
PCT Pub. Date: Nov. 17, 2016

(65) Prior Publication Data
US 2018/0106287 A1    Apr. 19, 2018

(30) Foreign Application Priority Data
May 12, 2015   (DE) .................. 10 2015 107 467

(51) Int. Cl.
*F16B 25/00*    (2006.01)
*F16B 25/10*    (2006.01)

(52) U.S. Cl.
CPC ...... *F16B 25/0015* (2013.01); *F16B 25/0047* (2013.01); *F16B 25/0068* (2013.01);
(Continued)

(58) Field of Classification Search
CPC .............. F16B 25/0015; F16B 25/0047; F16B 25/0057; F16B 25/0063; F16B 25/0068;
(Continued)

(56) References Cited

U.S. PATENT DOCUMENTS 5,569,009 A     10/1996  Suzuki
5,827,030 A  *  10/1998  Dicke ................. F16B 25/0015
                                                  411/387.4
(Continued)

FOREIGN PATENT DOCUMENTS

DE           54903 C      9/1889
DE      195 25 732 A1    1/1997
(Continued)

OTHER PUBLICATIONS

Die Schraube Für Das Holz Und Bauhandwerk; Catalog; 2012; pp. 1-68; Adolf Würth GmbH & Co. KG; Künzelsau, 74650, Germany.
(Continued)

*Primary Examiner* — Roberta S Delisle
(74) *Attorney, Agent, or Firm* — Robert A. Blaha; Smith Tempel Blaha LLC

(57) ABSTRACT

A screw has a shaft section which extends axially, a screw thread at the shaft section, which screw thread has thread turns that extend radially starting from the shaft section, a screw tip section which connects to the shaft section, at least one first scraping edge at the screw tip section, and at least one second scraping edge in a region of the shaft section adjacent to the screw tip section. The at least one first scraping edge and the at least one second scraping edge are spaced at a distance from each other and extend in an axial direction over different areas of the screw.

19 Claims, 3 Drawing Sheets

(52) U.S. Cl.
CPC .......... *F16B 25/0084* (2013.01); *F16B 25/00* (2013.01); *F16B 25/0063* (2013.01); *F16B 25/0078* (2013.01); *F16B 25/103* (2013.01)

(58) Field of Classification Search
CPC .............. F16B 25/0078; F16B 25/0084; F16B 25/103; F16B 25/00
USPC ................ 411/386, 387.2, 387.4, 387.5, 411
See application file for complete search history.

(56) References Cited

U.S. PATENT DOCUMENTS

| | | | |
|---|---|---|---|
| 6,328,516 B1 * | 12/2001 | Hettich | F16B 25/0015 411/311 |
| 6,669,424 B1 | 12/2003 | Bauer | |
| 8,480,342 B2 * | 7/2013 | Stiebitz | F16B 25/0015 411/386 |
| 9,957,994 B2 * | 5/2018 | Hsu | F16B 25/103 |
| 2003/0235483 A1 * | 12/2003 | Chen | F16B 25/0015 411/387.7 |
| 2013/0039720 A1 * | 2/2013 | Shih | F16B 25/0047 411/387.4 |
| 2017/0108026 A1 * | 4/2017 | Yang | F16B 25/103 |

FOREIGN PATENT DOCUMENTS

| | | |
|---|---|---|
| DE | 10 2004 018 069 A1 | 8/2004 |
| DE | 10 2008 057 678 A1 | 5/2010 |
| DE | 20 2011 100 601 U1 | 7/2011 |
| DE | 10 2010 028 344 A1 | 11/2011 |
| DE | 10 2013 213 338 A1 | 1/2015 |
| EP | 0 589 398 A1 | 3/1994 |
| EP | 0 939 235 A1 | 9/1999 |
| EP | 1 357 303 B1 | 10/2003 |
| EP | 1 411 252 A2 | 4/2004 |
| EP | 2 395 251 A1 | 12/2011 |
| JP | H07127616 A | 5/1995 |
| TW | M414507 U1 | 10/2011 |
| WO | WO 2015003906 A1 | 1/2015 |

OTHER PUBLICATIONS

Gewinde; Wikipedia; as found at https://de.wikipedia.org/wiki/Gewinde/; Apr. 27, 2015.

European Technical Approval ETA-12/0373; Schmid Schrauben Hainfeld GmbH, Hainfeld, 3170, Austria; pp. 1-36; published by European Organisation for Technical Approvals; validity from May 11, 2012 thru Apr. 11, 2017.

Representative Figure including Fig. 8 and Fig. 9 of EP 1 357 303 B1 (included above); published Oct. 29, 2003; (best version available).

Pirog, P.; Office Action in EPO Application 16 720 412.2-1010; dated Feb. 20, 2020; pp. 1-4; European Patent Office, 80298, Munich, Germany.

* cited by examiner

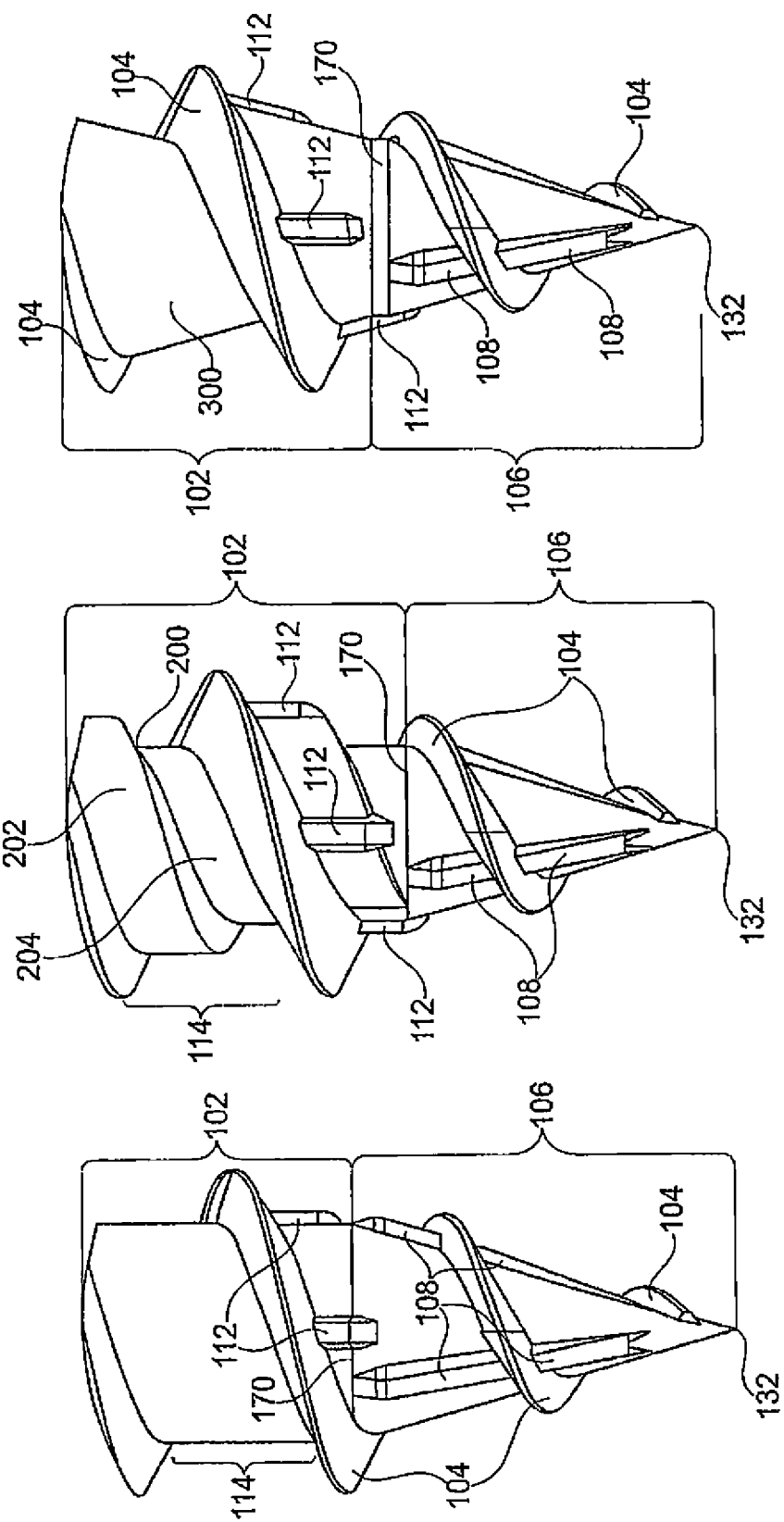

SCREW HAVING DISCONTINUOUS SCRAPING EDGES

CROSS-REFERENCE TO RELATED APPLICATIONS

This application is a National Stage Utility Application based on PCT/EP2016/059816, titled Screw Comprising Discontinuous Scraping Edges, filed on May 3, 2016, and claims the benefit of the filing date of May 12, 2015, of German Patent Application No. 10 2105 107 467.2, the disclosures of which are incorporated herein by reference in their entirety.

TECHNICAL FIELD

Embodiments of the invention relate to a screw, a method for manufacturing a screw, and a use.

BACKGROUND

A screw is a bolt (or pin), which may have a drive, wherein the bolt is provided with a screw thread at the outer side. In screws having a head, the annular area under the head serves as an abutment against the part, which is to be fixed to it.

From EP 0 589 398 B1 and/or DE 10 2010 028 344 A1 it is known for an underground of plastics or of a light metal to screw a screw having a screw thread into the underground (or subfont), wherein non-cylindrical core sections, which narrow (or taper) in the direction towards the screw head, are arranged between the thread turns. Thereby, the material of the underground of plastics or light metal, which material has been pushed aside (or displaced) during the screwing-in, is to flow only in a rear side direction along each core section up to the region of the core section having the smallest diameter, in order to enable a reduced screwing torque of the screw during the screwing-in after having a drilled a pilot hole which has been performed previously as a general rule.

For the introduction of a screw into an underground made of plastics it is stipulated to drill a pilot hole into the plastics underground and/or to provide this during the injection-moulding (primary shaping) and to subsequently screw-in a screw into the hole. The hole is pilot-drilled with a diameter which is larger than the shaft diameter of the screw. Thereby, sections of a screw for a plastics underground may have, between neighbouring thread turns, a shape which deviates from a cylinder geometry. In a screw from the company Reyher, which is referred to as RST, and which is for screwing-in into a pilot-drilled plastics underground, sections of the screw, between neighbouring thread turns, may be formed narrowing (or tapering) away from the screw head towards the opposite screw end. Demonstratively, the high thread turns of such screws for plastic undergrounds cut into the plastic material, which adjoins the pilot-drilled drill hole. Stated differently, the anchoring effect of such screws for plastic undergrounds is based solely on the anchorage of the thread turns in the pilot-drilled underground, whereas the screw shaft is standing substantially free in the pilot-drilled drill hole.

Totally different technical principles and physical framework conditions as compared to undergrounds of plastics or light metal apply to the introduction of a screw into wood. When introducing a screw into wood, the formation of a pilot drill hole is relinquished as a general rule; rather, a wood screw is typically screwed-in into a massive wood underground without drilling a pilot hole. Thereby, the screw thread of a wood screw cuts itself its counter-thread in the wood underground. An example of a known wood screw is the screw Assy Plus or Assy 3.0, which are marketed by the company Würth. The extrication value is a measure for the quality of the anchorage of a wood screw in a wood underground. Hereby, the drag force is referred to, which is necessary for pulling the wood screw out of the wood underground, thus for surmounting the holding force of the wood screw in the wood underground.

Even if the known wood screw of the type Assy Plus and/or Assy 3.0 exhibits already very good extrication values, a further improved extrication resistance of a wood screw is nevertheless desirable. Of course, such a screw shall have favourable properties in respect of the manufacturability.

DE 195 25 732 discloses a screw having a screw head, a screw shaft which has a screw thread as well as a screw tip section which has at least one cutting (or milling) rib, which forms a cutting edge that projects over the surface of the screw tip section.

EP 0 939 235 discloses a screw having a shaft part and a tip as well as at least one blade edge in the tip section, wherein a screw thread extends at least over partial lengths of the shaft part and the tip, wherein the blade edge is formed on at least one rib, which projects beyond the core diameter of the shaft part and has a smaller inclination angle with respect to the longitudinal axis of the screw than the screw thread, and wherein the screw thread extends over the total length of the tip up to the pointed end of the screw, wherein the tip has a cone-shaped end section, which is free of ribs, and over which the screw thread continues (or proceeds) continuously.

SUMMARY

There may be a need to provide a screw, which can be manufactured easily, and which has a high retention force.

This object is solved by the objects having the features according to the independent patent claims. Further embodiment examples are shown in the dependent claims.

According to an embodiment example of the present invention, there is provided a screw, which has the following: a shaft section which extends axially, a screw thread at the shaft section, which screw thread has thread turns that extend radially starting from the shaft section, a screw tip section which connects to the shaft section, at least one first scraping edge at (for example also at, in particular only at) the screw tip section (in particular radially extending beyond the screw tip section), and at least a second scraping edge in (for example also in, in particular only in) a region of the shaft section adjacent to the screw tip section (in particular projecting radially beyond the shaft section), wherein the at least one first scraping edge and the at least one second scraping edge are at a distance with respect to each other and extend in the axial direction over (or across) different (i.e. not completely identical, preferably free of axially overlaps) sections of the screw.

According to another embodiment example of the present invention, there is established a method for manufacturing a screw (in particular a wood screw) for (in particular without drilling a pilot hole (or pilot-hole-free)) introducing in an underground (in particular a wood underground), wherein in the method: a shaft section which extends axially is formed, a screw thread at the shaft section, which screw thread has thread turns that extend radially starting from the shaft section, is formed, a screw tip section which connects to the shaft section is formed, at least a first scraping edge is formed at the screw tip section, at least a second scraping edge is formed in a region of the shaft section adjacent to the screw tip section, and the at least one first scraping edge is formed at a distance with respect to the at least one second scraping edge such that the at least one first scraping edge and the at least one second scraping edge extend in the axial direction over (or across) different sections of the screw.

According to a further embodiment example of the present invention, a screw having the features described above is used for introducing, in particular without drilling a pilot hole (or in a pilot-hole-free manner) into a wood underground (or subfont).

In the context of this application, the term "scraping edge" may be understood to be a sharp edge or a blade (or cutting) edge, which may project radially with respect to the screw tip section, and which may be directed against the underground during the setting (or introducing) operation of the screw, and which may scrape, cut or mill material of the underground during the screwing-in of the screw into the underground.

According to an embodiment example, a screw may be provided, which may have a screw tip section, which may be configured especially for achieving high extrication (or pulling-out) forces and may have at least a first scraping edge, and an end region of the shaft section at the side of the screw tip, which end region may be configured accordingly and which may have at least a second scraping edge. In order to achieve high extrication forces (i.e. high forces for (undesirably) pulling a set (or installed) screw out of the underground) and nevertheless achieve a low effort (effort in terms of force) for introducing the screw into the underground, according to an exemplary embodiment of the invention, at least two discontinuous (or interrupted) scraping edges may be provided at the screw tip section and/or in the shaft section, which may support the screw during the setting (or installing) operation by way of a scraping removal of material of the underground. By the described positioning of the scraping edges as well as by the providing thereof at a distance from each other, it may be ensured however that the quantity of material of the underground, which may be removed by the scraping edges, is limited purposefully. Thus, it may be prevented that the screw, which may have been introduced into the underground, may sit too loosely in the underground due to an excessive removal of material, which would result in that the screw is possibly being unhinged (or excavated) again out of the underground already with little forces. Demonstratively, a scraped hole in the underground can be widened (or broadened) by at least one first scraping edge at the side of the screw tip maximally up to a core diameter of the shaft section (i.e. a minimum diameter of the shaft section). By the at least one second scraping edge, which may be arranged close to the screw tip section, but already in the shaft section, a radial widening of the hole up to the range of the thread turns can be effected in a range (or region) of the screwed-in screw, which range may be closer to the screw head. In a non-scrapable range (or region of the screw) between the scraping edges, preferably no removal of material may be effected due to the discontinuation, which may promote good extrication values of the screw. With the described arrangement of scraping edges, on the whole, an excessive removal of material of the underground, in particular in the radial direction, can be avoided. By the discontinuation and/or the provision at a distance from each other of the scraping edges in comparison to a continuous scraping edge, the force, which may act during the screwing-in of the screw and/or a resulting pressure on the underground (in particular the wood) may advantageously be reduced, whereby an excessive widening and thus an impairment of the extrication force of the screw may be avoided.

According to an embodiment example, a screw may be provided, which can be used particularly advantageously as a wood screw, and which can be anchored with a high extrication force in a wood underground preferably self-cuttingly and/or self-drillingly in particular without the necessity of forming a drill hole (or pilot hole) prior to the introducing of the screw into a wood underground.

Exemplary Embodiments of the Screw

In the following, additional exemplary embodiment examples of the screw, of the method and of the use are described.

According to an exemplary embodiment example, the at least one first scraping edge may be formed overlap-free (or without an overlap) in the axial direction of the screw with the at least one second scraping edge. Stated differently, there may then be an axial section in an axial extension direction of the screw between the end at the side of the screw head of the at least one first scraping edge and the end at the side of the screw tip of the at least one second scraping edge, in which axial section there may be provided neither the at least one first scraping edge nor the at least one second scraping edge.

According to an exemplary embodiment example, the thread turns may extend axially up to into the screw tip section (in particular even up to a screw tip end). Thereby, the rotatingly introducing of the screw and a cutting of a screw counter-thread in the underground (or subfont) can be facilitated. The at least one first scraping edge and/or the at least one second scraping edge may extend in the axial direction over (or across) one or more thread turns, or may be discontinued (or interrupted) in the region of one or more thread turns.

According to an exemplary embodiment example, the at least one first scraping edge may project radially less far than a thread turn provided in this region. Alternatively or supplementarily, the at least one second scraping edge may project radially less far with respect to the shaft section than a thread turn provided in this region. Thereby, the cutting of a screw counter-thread in the underground during the screwing-in of the screw into the underground may not be disturbed in an advantageous manner by the scraping edge.

According to an exemplary embodiment example, the at least one second scraping edge may extend wholly or partially within the one [of the thread turns, which is] next to the screw tip of the thread turns, which may be arranged at least partially in the shaft section. In other words, the at least one second scraping edge may be localized at least partially within the one of the thread turns, which may be arranged at least partially in the shaft section, and which may be arranged closest to the screw tip, in particular which may extend only precisely partially into the screw tip section. Further in particular, the at least one second scraping edge may end in an axial direction under the one of the thread turns, which one may be next to the screw tip of the thread turns, which may be arranged at least partially in the shaft section, still further which in particular may extend up to this thread turn (see FIG. 4 to FIG. 6).

According to an exemplary embodiment example, the ends of the first scraping edge and the second scraping edge, which ends may face each other in the axial direction, may be arranged within the same thread turn of the screw thread. Hereby, the mutually facing ends may be arranged within a thread turn, which may be located at least also in the region of the screw tip section. Furthermore, the mutually facing ends may be arranged within a thread turn, which may be arranged in a transition range between the screw tip section and the shaft section. In other words, the mutually facing ends may be arranged within a thread turn, which may be located partially in the (in particular conical (or cone-shaped)) screw tip section and partially in the (in particular cylindrical) shaft section.

According to an exemplary embodiment example, the at least one first scraping edge may be configured to widen (or broaden) a hole, which may have been formed in the underground by the screw, up to not more than a core diameter of the shaft section. Stated differently, a successively widening hole can be generated in the underground (preferably a wood underground) starting from a for example pointed tip at the end of the screw tip section during the self-drillingly forming of the hole by the screw, which hole may not extend radially up to the thread turns in the range of the at least one first scraping edge. Demonstratively, in the case of a wood underground, a feathering (or fibrillating) and/or a roving (or fraying) of the wood can be promoted by the scraping edge, which may be arranged the furthest in front in the screwing direction, what may facilitate the further operation of screwing-in the screw without favouring an undesired pulling out.

According to an exemplary embodiment example, the at least one first scraping edge can be configured to remove material of an underground, into which the screw may have to be introduced, in order to form in the underground an excavation (or void) for receiving the screw tip section and a core diameter of the shaft section.

According to an exemplary embodiment example, plural first scraping edges may be provided at the screw tip section. For example, at least two, in particular at least three, four or more first scraping edges may be arranged circumferentially circulating around the, for example cone-shaped (or conical) screw tip section. By the provision of plural first scraping edges it may be possible to obtain a force distribution, which may be more homogeneous in the peripheral direction during the introducing of the screw into the underground, and a drill hole, which may be formed more uniformly. For example, the plural first scraping edges may be arranged homogeneously around the circumference of the screw tip section, for example in a fixed (in particular equal) angular distance to each other.

According to an exemplary embodiment example, the at least one first scraping edge may extend along the screw tip section rectilinearly (or straight-lined), i.e. uncurved, in the axial direction. During the rotation operation of the screw during the introducing into the underground, this may result in a homogeneous load distribution in the axial direction and the radial direction.

According to an exemplary embodiment example, the at least one first scraping edge may extend over a thread turn at the side of the screw tip. In other words, a first partial section of the first scraping edge may be arranged at the side of the screw tip with respect to the thread turn, and a second partial section of the first scraping edge may be arranged at the side of the screw head with respect to this thread turn. In this way, the respective first scraping edge may extend over a sufficiently long axial region in order to effectively scrape off material of the underground.

According to an exemplary embodiment example, the at least one second scraping edge may be configured to widen (or broaden) a hole, which may have been formed in an underground by the screw up to a diameter between a core diameter of the shaft section and an outer diameter of the core threads. By the provision of the at least one second scraping edge, an alleviated (or made easier) screwing-in of the screw may be made possible by widening for example up to the largest core diameter of the shaft, and somewhat further if applicable, without impairing the extrication force (or pulling-out force) of the screw by a too strong radial broadening in the radial direction beyond the thread turns.

According to an exemplary embodiment example, the at least one second scraping edge may be configured to remove material of an underground, into which the screw may have to be introduced, in order to form in the underground an excavation (or void) for receiving a portion of the shaft section, which may have a larger outer diameter than a core diameter of the shaft section. However, the widening should not be effected beyond radial outer ends of the thread turns, because otherwise the excavation (or pulling out) forces of the screw would be decreased due to a too strong cutting (or milling), because the screw would then sit too loosely in a hole, which may then be too large, in the underground.

According to an exemplary embodiment example, plural second scraping edges can be provided in a transition range between the screw tip section and the shaft section. For example, at least two, in particular at least three, four or more, second scraping edges may be arranged circumferentially circulating around a, for example cylindrical (or cylinder-shaped) section of the shaft section. By the provision of plural second scraping edges it may be possible to obtain a force distribution, which may be more homogeneous during the introducing of the screw into the underground, and a drill hole, which may be formed more homogeneously. For example, the plural second scraping edges may be arranged homogeneously around the circumference (or perimeter), for example in a fixed angular distance to each other. The plural second scraping edges may be arranged parallel to each other and/or may extend in the axial direction of the screw and/or the shaft section.

According to an exemplary embodiment example, the at least one second scraping edge may extend along the shaft section rectilinearly (alternatively inclined to the central axis), i.e. uncurved, in the axial direction. During the rotation operation of the screw during the introducing into the underground, this may result in a more homogeneous load distribution in the axial direction and the radial direction.

According to an exemplary embodiment example, the at least one first scraping edge and/or the at least one second scraping edge may have a sharp cutting edge or a sawtooth edge. Other embodiments of the scraping edges, which scrapingly remove material, may also be possible.

According to an exemplary embodiment example, the at least one first scraping edge and/or the at least one second scraping edge may be configured as a cutting (or milling) rib. Such a cutting rib can be line-shaped in the axial direction with a cutting edge on the outside. The cutting rib may be shaped rectilinearly or curvedly (for example also circulating partially around the screw axis).

According to an exemplary embodiment example, a gap or a recess may be formed between the at least one first scraping edge and the at least one second scraping edge, in particular in the axial and/or the radial direction. An angular distance between a respective first scraping edge and a respective second scraping edge in the radial direction may be, for example, in a range between 30° and 60°, for example at 45°. Thus, a scraping removal of material may be avoided in the region of the gap, which may advantageously affect the excavation (or pulling out) forces of the screw.

According to an exemplary embodiment example, an end at the side of the screw head of the at least one first scraping edge ends at an axial position, starting from which an end at the side of the screw tip of the at least one second scraping edge, which end may be at a distance in the radial direction and/or in the circumferential direction from the at least one first scraping edge, may extend in the direction of the screw head.

According to an exemplary embodiment example, the at least one first scraping edge and the at least one second scraping edge may be at a distance to each other such that a continuous (or steady) or discontinuous (or discrete) edge, and/or more generally a transition between the screw tip section and the shaft section, may be scraping-edge-free (or free of a scraping edge). Stated differently, the at least one first scraping edge may end, in the viewing direction towards the screw head, before a transition of the screw tip section in the shaft section. By contrast, the at least one second scraping edge may begin, in the viewing direction towards the screw head, only after the transition of the screw tip section in the shaft section. An edge, at which no scraping or milling edge may be arranged, may be formed by a transition between a conical screw tip section and a cylindrical end section of the shaft section at the side of the screw tip, which end section may directly adjoin the screw tip section.

According to an exemplary embodiment example, the at least one first scraping edge and/or the at least one second scraping edge may be oriented paraxially (or axially parallel) in a side view of the screw. In other words, there may be a side view of the screw, in which the respective scraping edge extends precisely in the axial direction. This may result in a symmetrical load distribution during the introducing of the screw into an underground.

According to an exemplary embodiment example, the at least one first scraping edge and/or the at least one second scraping edge may have a radial component of extension. In particular, the first scraping edge may have, in a side view of the screw, both a radial and an axial component of extension, and may move for example on an envelope of cone (or on a cone-shaped shell) during the screwing-in.

According to an exemplary embodiment example, the at least one first scraping edge and/or the at least one second scraping edge may have a polygonal cross-section. This may be in particular a trapezoidal cross-section, a triangular (or triangle-shaped) cross-section or a rectangular (or rectangle-shaped) cross-section. Very different geometries may be possible in this respect.

According to an exemplary embodiment example, the screw tip section may be formed conically (or cone-shapedly). Alternatively, the screw tip section may take for example another rotationally symmetrical shape, in particular, in deviation from a cone shape, a convex or concave geometry at a superficies surface (of a cone shell).

According to an exemplary embodiment example, the shaft section may have an inhomogeneous outer diameter at at least one intermediate screw thread section between neighbouring thread turns. According to this particularly preferred embodiment example, the arrangement of scraping edges, which has been described above, which may prevent a too strong removal of material during the rotatingly introducing of the screw into an underground, may be combined synergistically with a geometry of the intermediate screw thread sections, in which geometry the latter may deviate from a continuous uni-radial cylindrical shape. Thereby, a particularly high excavation (or pulling out) force can be reached, because on the one hand only a moderate amount of material may be taken off by the scraping edges, which may effectively impede a pulling out of the screw out from the underground with only little effort (effort in terms of force). On the other hand, the material of the underground, which may then still be present thanks to the discontinuously formed scraping edge, may then be pushed (or urged) into geometrical inhomogeneities in the intermediate screw thread sections, that may further increase the excavation forces in a most advantageous manner.

According to an exemplary embodiment example, the shaft section may have a discontinuity (as an example for a geometry having an inhomogeneous outer diameter) at at least one intermediate screw thread section between neighbouring thread turns. In the context of this application, the term "discontinuity" may be understood to be in particular a feature of the surface structure within the intermediate screw thread section, at which feature of the surface structure the inclination of the surface trajectory of the intermediate screw thread section changes (in particular in a cross-sectional view along a plane which contains the screw axis), in particular changes abruptly or discontinuously (in the sense of a missing mathematical differentiability at this position). The sign of the inclination (i.e. the first derivative) of the curve of the external surface of the intermediate screw thread section in the axial direction may change at the position of the discontinuity from plus to minus, from minus to plus, from zero to plus, from zero to minus, or from zero, plus or minus to infinity. The progression (or course) of the curve at the position of the discontinuity may be effected angledly or roundedly (i.e. in an angled manner or in in a rounded manner). A receiving space for receiving material of the underground that may be displaced (or pushed aside) by the screw can be formed by the discontinuity. Accordingly, a screw can be provided, by which a high retaining force in an underground can be achieved in that not only the screw thread forms an anchoring screw counter-thread in the material of the underground, but in addition also at least a partial section of the intermediate screw thread section between neighbouring thread turns, which partial section may be confined by the discontinuity, displaces material of the underground in the radial direction and thus may compress the same during a successive axial advancing of the screw. Beside large ranges of the flanks of the screw thread, also at least a partial section of the intermediate screw thread section, which may deviate discontinuously from a continuous axial parallelity, between the thread turns, may be pressed against the material of the underground force-fittingly (or in a force-fitting manner) and/or frictionally engaged, and thus may increase the anchoring force. The forced heading (or compulsive advance) of the screw into the underground, which may be generated by the introducing of the screw thread into the underground, may result also in an additional component of the anchoring force due to the intermediate screw thread sections which may not be formed continuously uniradially [and not] paraxially. Thereby, the retaining force of the screw with respect to conventional screws may be improved and/or the excavating values are increased. Furthermore, in addition to this, the retaining force can be improved without the necessity of adding further screw core material, demonstratively thus by a mere relocation of screw core material, preferably from the front (i.e. from a range of the intermediate screw thread section at the side of the screw tip) to the back side (i.e. to a range of the intermediate screw thread section at the side of the screw head).

According to an exemplary embodiment example, the discontinuity at the at least one intermediate screw thread section can be formed as a step. In particular, such a step can be formed by two sections, which may be radially offset to each other and which extend substantially along the same extension direction, which sections may be connected by a connection section to another extension direction. A round transition or preferably an edge-type transition may be formed at the two connection positions. A discontinuity, which may be formed as a step, may be simple in terms of manufacture, may increase the excavation (or pulling out) force in a significant manner, and may effectively suppress to longitudinally shift the shaft section in an undesired manner during the manufacture by rolling (or milling).

According to an exemplary embodiment example, the step may be formed between two paraxial (or axially parallel) sections of the at least one intermediate screw thread section with different radii. According to this preferred embodiment example, the intermediate screw thread section may be formed by (advantageously precisely) two (preferably substantially cylindrical) sections having axes that may coincide with the screw axes (i.e. identical axes), which sections may extend radially outwardly differently far in a plane perpendicular to the screw axis. In a transition range between these sections, a step may be provided, which may be angled rectangularly with respect to each of these sections.

According to an exemplary embodiment example, the paraxial section having the larger radius may be arranged at the side of the screw head, and the paraxial section having the smaller radius may be arranged at the side of the screw tip. Thus, the intermediate screw thread section may narrow (or taper) in a stepped manner towards the screw tip, which may result in a high break torque and high excavation forces. An undesired break of the screw during the application of mechanical loads may thus be suppressed effectively.

According to an exemplary embodiment example, the discontinuity may extend outwardly in the radial direction less far than the radially outer ends of the thread turns. Thus, it may be ensured that the discontinuity may not disturb or influence the function of the screw thread.

According to an exemplary embodiment example, the discontinuity may circulate around a screw axis to the full extent (or completely), in particular circulate parallel to the thread turns helically around the screw axis. Thus, the discontinuity, which may then be formed for more of or all of the intermediate screw thread sections as a contiguous structure, may run parallel to turns (or windings) of the thread turns. This may allow a simple manufacturability and may avoid radial start and end positions.

According to an exemplary embodiment example, the shaft section may have, at at least one intermediate screw thread section, a section, which may narrow, in particular may taper conically, in the direction towards the screw tip section between neighbouring thread turns. According to an embodiment example, a wood screw may thus be provided, which can be anchored in a wood underground in a self-cutting and/or self-drilling manner without the necessity of forming a drill hole (or pilot hole) prior to the introducing of the wood screw into a wood underground. Thereby, a high retaining force may be achieved not only in that the self-cutting screw thread cuts an anchoring screw counter-thread in the wood material, but in addition in that also the sections between neighbouring thread turns, which sections may narrow (or taper) in the direction towards the screw tip section, may displace wood material in a radial direction during a successive axial advancing of the wood screw and thus compress this wood material, such that beside large ranges of the flanks of the screw thread, also the tapering intermediate screw thread sections between the thread turns may be pressed against the wood material in a force-fitting and/or a frictionally engaging manner, and thus may increase the anchoring force. The forced (or compulsive) advancing of the screw into the wood underground generated by the self-grooving (or self-channelling) screwing-in of the screw thread into the wood underground may also result in an additional radial component of the anchoring force due to the tapering of the intermediate screw thread sections. Thereby, the retaining force of the wood screw with respect to conventional wood screws may be improved and/or the excavation values may be increased. Furthermore, in addition to this, the retaining force may be improved without the necessity of the addition of further screw core material, demonstratively thus by a mere relocation of screw core material from the front side to the rear side. By the tapering direction of the intermediate screw thread sections coinciding with and/or being identical to the axial introducing direction of the wood screw into the wood underground, the for example wedge-shaped and/or arrow-shaped intermediate screw thread sections of the screw may displace (or push aside) the surrounding material in a similar manner as screws which may have a cylindrical core, because the cross-sections are equally large, however the radially increased flanks of the screw thread may presumably increase the retaining force of the screw as well as the changed pressure conditions induced by the inclination of the intermediate screw thread sections.

According to an exemplary embodiment example, the respective intermediate screw thread sections, which may have an inhomogeneous outer diameter (in particular having a discontinuity and/or a tapering section), may be formed between more than half, preferably between more than 75%, further preferred between more than 90%, and mostly preferred between all neighbouring screw threads. Particularly preferred, discontinuities and/or tapering sections may be formed at the shaft section between all neighbouring thread turns. Alternatively, only a partial section of the shaft section may be provided with discontinuities and/or tapering sections, whereas other intermediate screw thread sections may have a different, for example cylindrical, partial section of the shaft. A discontinuity and/or a tapering section may be provided also between the thread turn next to the screw head and the screw head.

According to an exemplary embodiment example, an outer profile of the at least one intermediate screw thread section, which may have an inhomogeneous outer diameter (in particular having a discontinuity or having a tapering) may be inclined with respect to screw axis at least in partial sections such that an additional material which may be connected (or adjoining) to a respective thread turn at the rear side may be compensated by a missing material connected to (or adjoining) a respective thread turn on the front side. Stated differently, precisely that amount of material may be deployed in a thickened range in comparison to an imaginary corresponding cylindrical screw core, which amount may be missing in a thinned range on an opposite other side with respect to the cylinder geometry of a screw core having the same mass. Thus, in total (or in sum), the mass of an intermediate screw thread section, which may have an inhomogeneity, may equal the mass of a corresponding intermediate screw thread section, which may be free of an inhomogeneity, and which may be continuously paraxial. This is advantageous, because the intermediate screw thread sections, which may have a discontinuity or which may have a tapering section can thus be manufactured by a pure relocation of material (in particular by rolling) starting from a green body (or blank) and thus with little effort, in comparison to a method which may apply an additional material or in comparison to a method which may remove material.

According to an exemplary embodiment example, the screw may be configured as a wood screw for, in particular pilot-hole-drilling-free (or without drilling a pilot hole), introducing into a wood underground (or subfont), in particular a solid (or massive) wood underground. The geometry of the screw may be particularly suitable for the incorporating displaced wood material of a wood underground. By the screw being introducible into a wood underground without drilling a pilot hole, a simple mounting may be enabled. Preferably, the screw thread may then also be configured as a self-cutting screw thread.

According to an exemplary embodiment example, the screw may further have a screw head, which may be connected directly or indirectly to the shaft section at the rear side. Optionally, also a section, which may be free from a screw thread, may be provided for example adjoiningly to the screw head, in particular if (or in a case where) one wood component is to be mounted on another wood component. For other applications (for example mounting a metal component on a wood component), a complete (or entire) screw thread without a section, which may be free of a screw thread, and which may directly adjoin the screw head, may be used.

According to an exemplary embodiment example, the screw head may be provided with a drive (or drive mechanism) for rotatingly driving the screw. Such a drive may serve for a form-fitting (or form-locking) contact with a tool for screwing-in the screw, such as for example a muscle-driven screwdriver or a motor-driven setting device (for example a cordless electric screwdriver). An end at the rear side of the screw may thus be formed by a screw head, which may have a drive for rotatingly driving the screw. The drive may be configured as a longitudinal slot, as a cross slot, as an inbus, as a TORX drive, or as an AW drive.

Screws according to exemplary embodiment examples of the invention may be formed with a symmetrical or an asymmetrical screw thread. In the case of an asymmetrical screw thread, the rising flank may be provided with a different inclination angle than the declining flank, whereas in the case of a symmetric screw thread, the angle of the rising flank and that one of the declining flank may be equal. Screws (in particular wood screws) according to the invention may be formed self-cuttingly and/or self-groovingly in an underground (in particular, a wood underground). A self-drilling and/or self-cutting tip may be used as a screw tip section for screws according to exemplary embodiment examples, which tip may be pinched (or wimped out) or rolled (or milled). Screws according to exemplary embodiment examples may be manufactured for example from stainless steel (rustproof), carbon steel, etc. The screw may be coated (for example waxed) or zinc-plated (zinc-coated), or may firstly be zinc-plated and then waxed, in order to further improve the sliding properties of the screw in an underground.

Exemplary embodiment examples of the present invention are described in detail in the following with reference to the following figures.

BRIEF DESCRIPTION OF THE DRAWINGS

FIG. 4, FIG. 5 and FIG. 6 each show a respectively magnified representation of the screw tip sections of the wood screws according to FIG. 1 to FIG. 3.

DETAILED DESCRIPTION OF EXEMPLARY EMBODIMENTS

Figure 1:
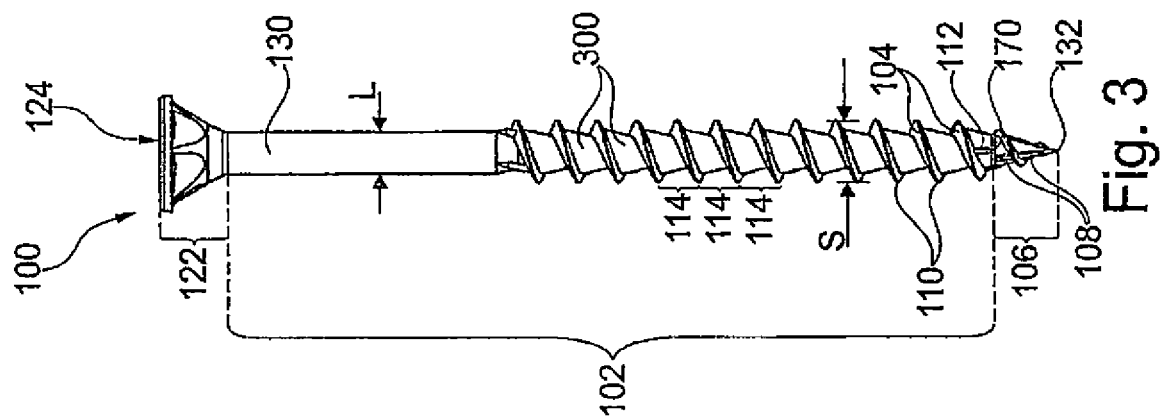
FIG. 1 shows a wood screw according to an exemplary embodiment example, which has discontinuous scraping edges at and/or near a screw tip section, and which has a cylindrical intermediate screw thread section at a shaft section.

Same or similar components in different figures are provided with same reference numerals.

Before exemplary embodiment examples of the invention are described with reference to the figures, some general aspects of the invention shall still be explained.

According to an exemplary embodiment example of the invention, a screw may be provided, which may advantageously be usable as a wood screw, and which may have discontinuous milling edges at the screw tip section and/or at the shaft section.

In screws, in particular wood screws, the flank surface, which may point towards the head of the screw, may have to be formed particularly high. Now, if the milling edges between the thread turns of a screw have the same height as in a thread core section, which may have a greater distance to the screw axis, the milling edges millingly may remove too much material and the excavation (or pulling-out) force may be reduced.

In order to surmount this problem, according to an exemplary embodiment example, a too large milling and/or a too large scraping may be prevented by milling ribs or scraping edges, which in first instance may make space for the tip and then are adjusted to the respective height of the screw thread core. This may be prevented in particular by arranging continuous milling ribs or scraping edges on the screw thread tip, which ribs or edges may perform a pre-milling for the screw thread tip and the thin core diameter. In the range of the transition between the screw thread tip and the thread shaft, additional milling ribs or scraping edges may be arranged such that they mill free or scrape free only portions of the screw thread core, which may have a larger diameter than the minimum core diameter. The milling too great, or the scraping too large, may be prevented and thereby high excavation forces may be achieved by milling ribs which may be adapted to the height between the screw thread core. Due to the interruption of the milling edges or scraping edges, no material may be millingly removed away or scrapingly removed away at the lower portion of the screw thread.

The milling edges or scraping edges may be rotated for example axially parallel (or paraxial) or at an angle (for example in a range between −60° and +60°. In addition, the milling edges or scraping edges at the tip may be rotated radially towards the milling edges or scraping edges in the screw thread base. The milling ribs or scraping edges may have a trapezoidal cross-section. The milling ribs or scraping edges may also have different cross-sections, such as for example triangular (or triangle-shaped) (for example equilateral, right-angled or right-angled-equilateral, wherein the 90° angle in the triangle may be spaced at a distance farthest from the screw axis, or the leg having the 90° angle may adjoin tangentially to the core of the screw). Furthermore, the milling ribs or scraping edges may be formed as rectangles, squares, or other polygon-shaped bodies, which may have surfaces that are curved outwardly or inwardly. It may be possible to establish the milling ribs as segments (demonstratively, for example formed similar as in a boomerang, set forwardly or backwardly) or as an inclination having distances to the screw thread.

FIG. 1 shows a side view of a wood screw 100 according to an exemplary embodiment example, which is formed from steel, which is waxed at the surface, which has a shaft section 102 having a screw thread 104 between a cone-shaped screw tip section 106 and a screw head 122. The shaft section 102 has cylindrical intermediate screw thread sections 114. A central longitudinal axis or screw axis is shown with the reference numeral 120. FIG. 4 shows a magnified representation of the screw tip section 106 together with the scraping edges 108, 112.

The wood screw 100 shown in FIG. 1 may be configured such that it can be turned (or screwed-in) into a solid wood underground (or subfont) without the necessity to establish a pilot drill hole in the wood underground (i.e. pilot-hole-free) prior to the screwing-in of the wood screw 100 in a solid wood underground (not shown). According to exemplary embodiment examples of the invention, as a general rule, it may even be desired to dispense with a pilot drill hole, because this may result in particularly high excavation values of the screwed-in wood screw 100.

On a rear side of the central shaft section 102, which may have the screw thread 104 that may be self-cutting in wood, there may be connected the screw head 122 having a drive 124, which in the embodiment example according to FIG. 1 may be spaced at a distance by an optional section 130, which may be free of a screw thread, and which may have a constant outer diameter L. The drive 124 (or drive mechanism) may be configured such that a rotating tool (not shown) may engage form-fittingly in the drive 124, and may screw the wood screw 100 into the solid wood underground, without drilling a pilot hole, by applying a torque to the wood screw 100. At a front side of the shaft section 102—with respect to a setting direction of the wood screw 100—the screw thread 104 thereof may end directly in the conical (or cone-shaped) screw tip section 106, which may be directly connected to the screw thread 104, whereby the capability of the wood screw 100 to be screwed into the solid wood underground without drilling a pilot hole may be effected and/or facilitated. Stated more precisely, the screw thread 104 may start in the direct vicinity of a pointed end 132 of the cone-shaped screw tip section 106. Stated differently, the screw thread 104 of the shaft section 102 may transition seamlessly to the pointed tip 132. Thereby, it can be achieved that by a mere putting the pointed tip and/or the point-shaped end 132 on the solid wood underground and by applying a moderate pressure and a torque on the drive 124, the point-shaped tip may be pushed or pressed rotatingly onto the wood underground, which may then result in a screwing-in of the wood screw 100 and to a self-cutting of the screw counter-thread in the wood underground.

The shaft section 102 may extend axially (and substantially rotationally symmetrically) along the screw axis 120. The screw thread 104, which may be formed at the outer side of the shaft section 102, may have thread turns 110, which may extend radially starting from the shaft section 102 and circulate helically, and which may form the radially outermost region of the shaft section 102.

The cone-shaped screw tip section 106 may adjoin the shaft section 102, wherein an edge 170 may be formed at a transition between the shaft section 102 and the screw tip section 104. First scraping edges 108 may be provided radially extendingly, distributed in the circumferential direction, exclusively at the screw tip section 106. Second scraping edges 112, which may be homogeneously distributed in the circumferential direction, may be formed separately and at a distance from the first scraping edges 108 with emphasis in a range of the shaft section 102, neighbouring the screw tip section 106 and radially extending beyond said range, wherein extensions (or tails) and/or declining flanks of the second scraping edges 112 may reach slightly into the screw tip section 106. Gaps may be provided in the radial direction between the first scraping edges 108 and the second scraping edges 112. The pressure on the wood material, which may be applied during the screwing-in of the screw 100, may be significantly reduced by the interruption and/or the providing at a distance (or in a spaced manner) of the scraping edges 108, 112 in comparison to a continuous scraping edge, whereby an excessive widening and thus an impairment of the excavation force of the screw 100 may be avoided. This effect may be further amplified by the merely radial offset of the first scraping edges 108 with respect to the second scraping edges 112. The first scraping edges 108 may extend in the axial direction (see reference numeral 120) over different regions and/or axial sections of the screw 100 in comparison to the second scraping edges 112.

The first scraping edges 108 may be configured to widen (or broaden) a hole, which may have been formed in the underground by the screw 100, to a constant core diameter d of the shaft section 102. Thus, the first scraping edges 108 may be configured to remove material of an underground, into which the screw 100 may have to be introduced, in order to form in the underground an excavation (or void) for receiving the screw tip section 106 and the core diameter d of the shaft section 102.

In contrast to this, the second scraping edges 112 may serve (or function) to widen a hole, which may have been formed in the underground by the screw 100, to a diameter between the core diameter d of the shaft section 102 and an outer diameter S of the thread turns 110.

Both the first scraping edges 108 and the second scraping edges 112 may be ribs, which may run straightly (or rectilinearly). While the first scraping edges 108 may run along an envelope of cone (or cone-shaped shell), the second scraping edges may be arranged parallel to each other on a cylindrical shell. The first scraping edges 108 and the second scraping edges 112 each may have a trapezoidal cross-section.

A high excavation force can be reached by the shown arrangement of the scraping edges 108, 112.

Figure 2:
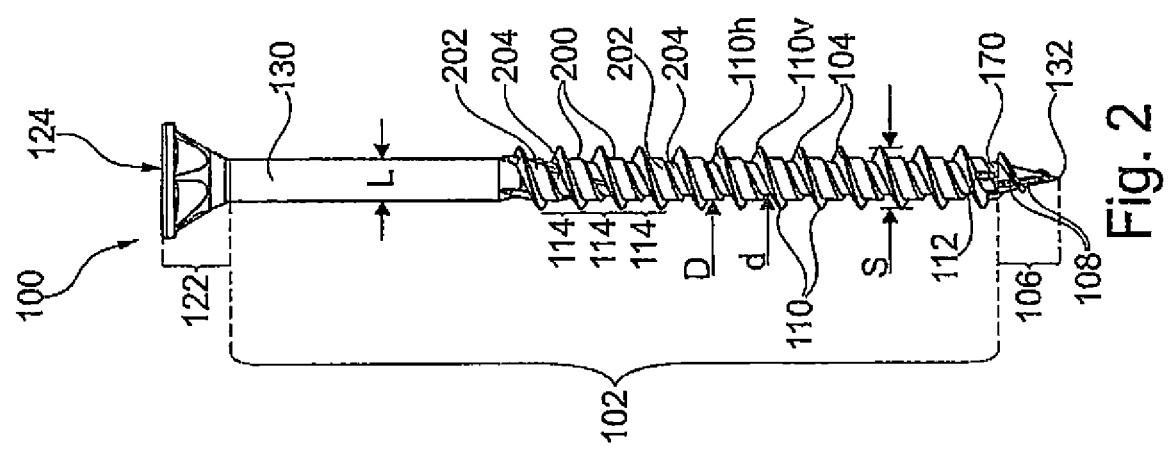
FIG. 2 shows a wood screw according to another exemplary embodiment example, which has discontinuous scraping edges at and/or near a screw tip section, and which has an intermediate screw thread section at the shaft section, which have a discontinuity.

FIG. 2 shows a wood screw 100 according to another exemplary embodiment example, which has interrupted (or discontinuous) scraping edges 108, 112 at and/or near a screw tip section 106, and which has intermediate screw thread sections 114 at the shaft section 102, which have a discontinuity 200. FIG. 5 shows a magnified representation of the screw tip section 106 together with the scraping edges 108, 112.

The shaft section 102 according to FIG. 2 and FIG. 5 may have an inhomogeneous outer diameter at a respective intermediate screw thread section 114 between neighbouring thread turns 110. Stated more precisely, the shaft section 102 may have, at an intermediate screw thread section 114 between neighbouring thread turns 110, a discontinuity 200 in the form of a step between two axially parallel partial sections 202, 204 of the intermediate screw thread section 114 with different outer diameters, which are referred to in FIG. 2 as d and D. According to FIG. 2, the following may hold: D>d.

The particularly good retaining force of the wood screw 100 in a solid wood underground may be based not only on a form-fit (or form-fit connection) between the self-cutting screw thread 104 of the wood screw 100 on the one hand, and a screw counter-thread which may have been self-cut in the solid wood underground, but in addition on a displacement (or expulsion) and compression of wood material due to the sections and/or intermediate screw thread sections 114, which may run radially inwards in a stepped (or staged) manner towards the screw tip section 106 and which may push against the displaced and compressed wood material on all sides and to the full extent around the wood screw 100 in a frictionally engaged manner during the setting operation and in the set state of the wood screw 100.

Thus, the discontinuity 200 may be provided as an intentional mechanical disturbing structure at a respective intermediate screw thread section 114, i.e. a respective axial section of the screw 100 between a mutually neighbouring pair of thread turns 110. In other words, a shape feature may be formed in the region of the discontinuity 200 at the intermediate screw thread section 114, at which shape feature the extension direction of the outer surface of the screw 100 may not extend parallel to the screw axis 120. The intermediate screw thread section 114 may have, at the step, a transition surface, which may run substantially perpendicular to the screw axis 120.

As is shown in FIG. 2, the discontinuity 200 may be axially spaced at a distance from both thread turns 110, which may axially confine the corresponding intermediate screw thread section 114. The discontinuity 200 may thus be provided spatially separated from the respective stepped transition between a thread turn 110h at the rear side and the axially parallel section 202 on the one hand and between a thread turn 110v at the front side and the other paraxial section 204 on the other hand. The discontinuity 200 may run around the screw axis 120 in several turns (or windings), namely in a spiral-shaped manner parallel to the thread turns 110 helically around the screw axis 120.

The paraxial section 202 having the larger diameter D may thereby be arranged at the side of the screw head, i.e. may be closer to the screw head 122, than the paraxial section 204 having the smaller diameter d. Accordingly, the paraxial section 204 having the smaller diameter may be arranged at the side of the screw tip, i.e. closer to the screw tip section 106 than the paraxial section 202 having the larger diameter D. The paraxial section 202 having the larger diameter D may have a diameter of approximately 75% of the outer diameter S of the screw thread 104. Furthermore, D may be approximately equal to the diameter L of the section 130, which may be free from a screw thread. The paraxial section 202 having the smaller diameter d may have a diameter of approximately 50% of the outer diameter S of the screw thread 104. A smallest diameter of the wood screw 100 may be the diameter of the thread core of the screw thread 104 and is referenced with d.

An exceptionally high excavation (or pulling-out) force can be reached by the shown arrangement of the scraping edges 108, 112 in co-operation with the intermediate screw thread sections 114 having the discontinuity 200. According to FIG. 2 and FIG. 5, the first scraping edges 108 and the second scraping edges 112 may be spaced at a distance from each other such that the edge 170 at the transition between the cone-shaped screw tip section 106 and the cylindrical beginning of the shaft section 102 is free of scraping edges. Stated differently, the first scraping edges 108 may end already beneath the edge 170, and the second scraping edges, which may be axially and in addition radially offset with respect to the first scraping edges 108, may start above the edge 170. The edge 170 itself may thus be covered neither by the first scraping edges 108 nor by the second scraping edges 112. The second scraping edges 112 therefore may operate to remove material of an underground, into which the screw 100 may have to be introduced, in order to form in the underground an excavation (or void) for receiving a part of the shaft section 102, which may have the larger outer diameter D than the core diameter d of the shaft section 102.

Figure 3:
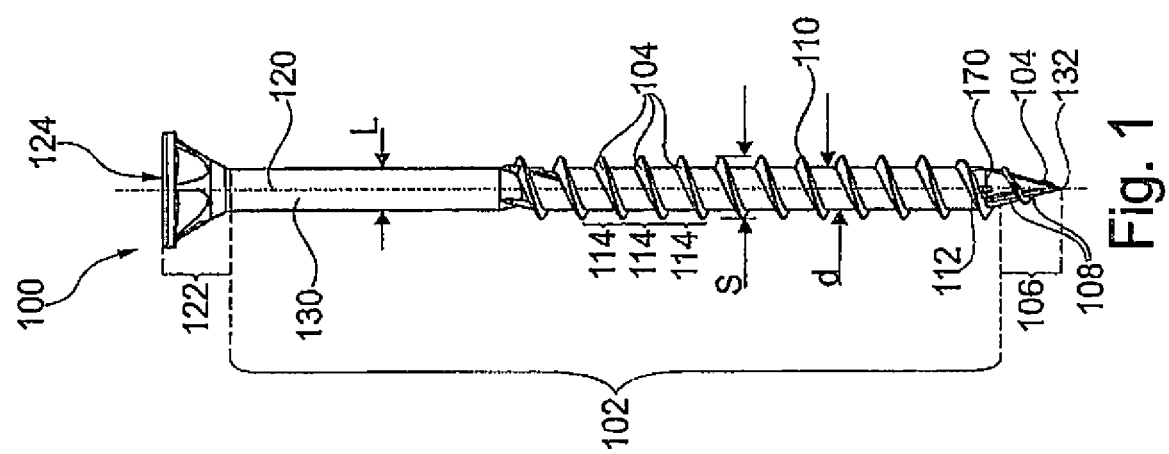
FIG. 3 shows a wood screw according to still another exemplary embodiment example, which has a discontinuous scraping edge at and/or near a screw tip section, and which has an intermediate screw thread section at the shaft section, which taper towards the screw tip section.

FIG. 3 shows a wood screw 100 according to another exemplary embodiment example, which has discontinuous (or interrupted) scraping edges 108, 112 at and/or close to a screw tip section 106, and which has intermediate screw thread sections 114 arranged at a shaft section 102, which taper conically towards the screw tip section 106. FIG. 6 shows a magnified representation of the screw tip section 106 together with the scraping edges 108, 112.

According to FIG. 3 and FIG. 6, the shaft section 102 may have sections 300, which may taper conically in the direction towards the screw tip section 106, at the respective intermediate screw thread sections 114 between neighbouring thread turns 110.

The particularly high retaining force of the wood screw 100 in a solid wood underground may be based not only on a form-fitting connection (or form-fit) between the self-cutting screw thread 104 of the wood screw 100 on the one hand and a screw counter-thread that is self-cut in the solid wood underground, but in addition also on a displacement and compression of wood material by the sections 300, which may taper towards the screw tip section 106, and which may push against the displaced and compressed wood material on all sides and completely (or to the full extent) around the wood screw 100 in a frictionally-engaging manner during the setting operation and in the set state of the wood screw 100.

As has been mentioned already, sections 300, which may taper conically in the direction towards the screw tip section 106, and which may have a substantially frustoconical geometry, may be arranged between neighbouring thread turns 110 of the screw thread 104. These intermediate screw thread sections 114 may be, in combination with the coupling of the screw thread 104 to the screw tip section 106 and the provision of the scraping edges 108, 112 for introducing the wood screw 100 into a solid wood underground without drilling a pilot hole, may be the actual reason for the increased retaining force of the wood screw 100 in the wood underground. Namely, if after the putting of the point-shaped end 132 on an outer surface of the solid wood underground by rotatingly driving the drive 124, the wood screw 100 may be introduced into the wood underground in a self-drilling and self-cutting manner, the screwing-in of the screw thread 104 into the already formed portion of the screw counter-thread in the wood underground may cause an urged (or forced) advancing of the wood screw 100 into the wood underground. It is believed that due to the resulting combined rotating and axial movement of the wood screw 100 down and into the wood underground, the intermediate screw thread sections 114, which may be inclined to the screw axis 120, inevitably displace and compress wood material, and exert (or apply) thereon a combined axial and radial force. Stated differently, precisely the intermediate screw thread sections 114 may impact partly axially, partly radially on the wood material, may push forward in a wedge-shaped manner through the wood material, may grout the solid wood fibres and the softer regions of the wood underground arranged therebetween in a lateral direction, and may fixedly anchor the wood screw 100 in the solid wood underground with generation of an additional retaining force. Already previously, the scraping edges 108, 112 may have feathered (or fibrillated) the wood in a limited manner and therefore may facilitate the screwing-in of the shaft section 102 into the underground.

Thus, a very high excavation force can be achieved by the shown arrangement of the scraping edges 108, 112 in co-operation with the intermediate screw thread sections 114 having the conical tapering.

Figure 7:
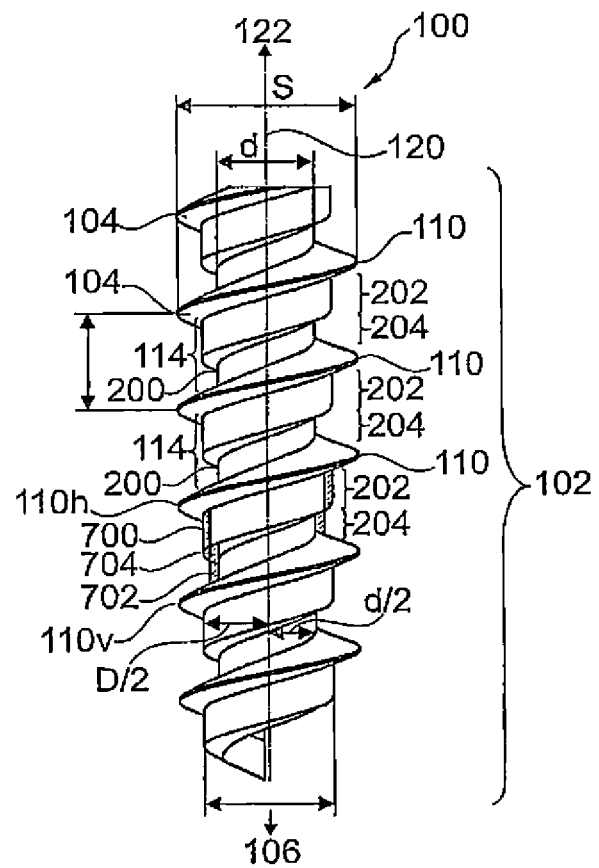
FIG. 7 shows a magnified representation of a portion of the shaft section together with a screw thread of the wood screw according to FIG. 2.

FIG. 7 shows a magnified representation of a part of the shaft section 102 together with the screw thread of the wood screw 100 according to FIG. 2.

FIG. 7 shows, using the example of a stepped intermediate screw thread section 114, that the discontinuity 200 thereof may be formed such that an additional material 700, which may connect to a screw thread 110h at the rear side, may just be compensated by a missing material 702, which may connect to a thread turn 110v on the front side. Thus, the intermediate screw thread section 114 may be offset paraxially with respect to the screw axis 120 partly inwardly, partly outwardly, such that the intermediate screw thread section 114 may intersect a hypothetical and/or virtual mass-equivalent cylinder core in the center (see the center point 704) between the thread turn 110h at the rear side and the thread turn 110v on the front side. This shows, that in wood screws 100 according to exemplary embodiment examples, the stepped intermediate screw thread sections 114 may be formed merely by a re-shaping and/or relocation of material from a screw region on the front side to a screw region at the rear side. This re-shaping or relocation of material may be effected for example during the normal manufacturing process of the wood screw 100 by rolling (or milling). Thus, an expensive additional application of material as well as an expensive process of removing material may be avoided. Rather, the axial parallel sections 202, 204 of the intermediate screw thread sections 114, which may narrow in a step-wise manner towards the front side, may be effected during the normal manufacturing process of the wood screw 100 without additional process step and thus without additional expenditure of time.

Figure 8:
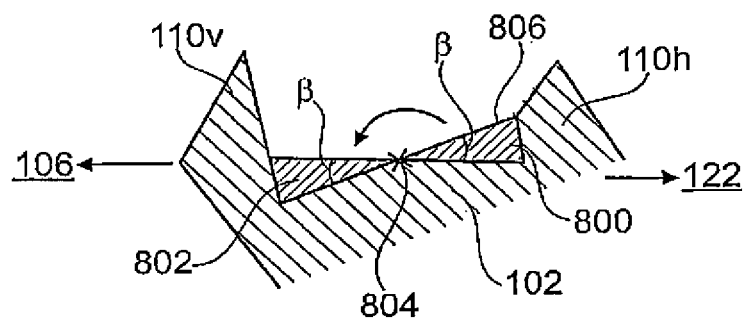
FIG. 8 shows a magnified representation of a section at an intermediate screw thread section of the wood screw according to FIG. 3, which section is mass-compensated and tapers conically to a screw tip section.

FIG. 8 shows a magnified representation of a mass-compensated section and/or intermediate screw thread section 114 at a shaft section 102 of a wood screw 100 according to an exemplary embodiment example of the invention, which section narrows (or tapers) conically towards the screw tip section 106.

FIG. 8 shows, using the example of a conically tapered intermediate screw thread section 114, that the outer edge 806 thereof may be deviated (or pivoted) in the cross-section with respect to a screw axis 120 (see FIG. 1) such that an additional material, which may connect to a thread turn 110h at the rear side, may just be compensated by a missing material 802, which may adjoin a thread turn 110v on the front side. Thus, the intermediate screw thread section 114 may be deviated (or pivoted) (see angle β) with respect to the screw axis 120 around a rotation axis that may run perpendicular to the paper axis of FIG. 8 and through a center point 804, such that the intermediate screw thread section 114 may intersect a hypothetical and/or virtual mass-equivalent cylinder core in the center (see center point 804) between the thread turn 110h at the rear side and the thread turn 110v on the front side. This shows, that in wood screws 100 according to exemplary embodiment examples, the tapered intermediate screw thread sections 114 may be formed merely by a re-shaping and/or relocation of material from a thread region on the front side to a thread region at the rear side. This re-shaping and/or relocation of material may be effected for example during the normal manufacturing process of the wood screw 100 by means of rolling (or milling). Thus, an expensive additional application of material as well as an expensive process of removing material may be avoided. Rather, the intermediate screw thread sections 114, which may be tapered towards the front side, can be effected during the normal manufacturing process of the wood screw 100 without an additional work step, and thus without additional expenditure of time. Thus, if the virtual pivot axis is positioned in the middle between two thread turns 110, then the amount of material, which may added at the thickened region, may be removed from the thinned region.

Furthermore, FIG. 8 shows that a pivot angle β of the tapered intermediate screw thread section 114 with respect to a screw axis 120 may amount, for example, to 15°. A pronounced increase of the retaining force may be achieved in particular for a pivot angle between approximately 5° and approximately 25°, without excessively increasing the screwing-in torques.

The obtained excavation force may advantageously be significantly increased with the wood screws 100 shown in FIG. 1 to FIG. 3, but especially particular with the wood screws 100 shown in FIG. 2 and FIG. 3.

Supplementarily, it is to be noted that "having" (or "comprising") does not exclude other elements or steps, and that "a" or "an" does not exclude a plurality. Furthermore, it is to be noted that features or steps, which have been described with reference to one of the above embodiment examples, may also be used in combination with other features or steps of other embodiment examples described above. Reference numerals in the claims are not to be considered as a limitation.

The invention claimed is:
1. A screw, comprising:
a shaft section which extends axially,
a screw thread at the shaft section, which screw thread has thread turns that extend radially starting from the shaft section,
a screw tip section which connects to the shaft section,
at least one first scraping edge at the screw tip section,
at least one second scraping edge in a region of the shaft section adjacent to the screw tip section,
wherein the at least one first scraping edge and the at least one second scraping edge are at a distance from each other and extend in the axial direction over different sections of the screw;
wherein mutually facing ends of the at least one first scraping edge and the at least one second scraping edge are arranged within the same thread turn.

2. The screw according to claim 1, wherein the at least one second scraping edge extends completely or partially within a thread turn, which is next to the screw tip and which extends at least partially in thread turns located in the shaft section.

3. The screw according to claim 1, wherein the at least one first scraping edge is configured to widen a hole, which has been formed by the screw in an underground to not more than a core diameter of the shaft section.

4. The screw according to claim 1, wherein the at least one first scraping edge is configured to remove material of an underground, into which the screw is to be introduced, so as to form in the underground an excavation for receiving the screw tip section and a core diameter of the shaft section.

5. The screw according to claim 1, wherein the at least one second scraping edge is configured to widen a hole, which has been formed by the screw in an underground to a diameter between a core diameter of the shaft section and an outer diameter of the thread turns.

6. The screw according to claim 1, wherein the at least one second scraping edge is configured to remove material of an underground, into which the screw is to be introduced, so as to form in the underground an excavation for receiving a part of the shaft section which has a larger outer diameter than a core diameter of the shaft section.

7. The screw according to claim 1, wherein the at least one first scraping edge and/or the at least one second scraping edge is or are configured as a cutting rib.

8. The screw according to claim 1, wherein a gap or a recess is formed between the at least one first scraping edge and the at least one second scraping edge.

9. The screw according to claim 1, wherein the at least one first scraping edge and/or the at least one second scraping edge is oriented paraxially in a side view of the screw.

10. The screw according to claim 1, wherein the at least one first scraping edge and/or the at least one second scraping edge has, in a side view of the screw, a radial component of extension.

11. The screw according to claim 1, wherein the at least one first scraping edge and/or the at least one second scraping edge has a polygonal cross-section selected from the group consisting of a trapezoidal cross-section, a triangular cross-section or a rectangular cross-section.

12. The screw according to claim 1, wherein the screw tip section is formed conically.

13. The screw according to claim 1, wherein the screw comprises at least one of the following features:
the shaft section has an inhomogeneous outer diameter in at least one intermediate screw thread section between neighbouring thread turns,
the shaft section has a discontinuity between two paraxial partial sections of the intermediate screw thread section in at least an intermediate screw thread section between neighbouring screw threads, and
the shaft section has, in at least one intermediate screw thread section between neighbouring screw threads, a section which is tapering in a direction towards the screw tip section.

14. The screw according to claim 13, wherein the screw comprises at least one of the following features:
at the shaft section, the respective intermediate screw thread sections are configured with an inhomogeneous outer diameter, a discontinuity, and/or a tapering section between more than one half of all neighbouring screw threads, and
an outside profile of the at least one intermediate screw thread section deviates with respect to a screw axis such that an additional material, which connects to a respective thread turn at the rear side is compensated by a missing material, which connects to a respective screw thread on the front side.

15. The screw according to claim 1, configured as a wood screw for introducing in a manner without drilling a pilot hole, into a wood underground.

16. The screw according to claim 1, further comprising:
a screw head which is connected directly or indirectly to the shaft section at the rear side, wherein the screw thread is provided with a drive for rotatingly driving the screw, wherein the drive is configured as a longitudinal slot, as a cross-slot, as an inbus, as a TORX drive or as an AW drive.

17. The screw according to claim 1, wherein the at least one first scraping edge and the at least one second scraping edge are at a distance from each other such that an edge at a transition between the screw tip section and the shaft section is free of a scraping edge.

18. A method for manufacturing a screw for introducing into an underground, the method, comprising:
forming a shaft section which extends axially,
forming a screw thread at the shaft section, which screw thread has thread turns that extend radially starting from the shaft section,
forming a screw tip section which connects to the shaft section,
forming at least a first scraping edge at the screw tip section,
forming at least a second scraping edge in a region of the shaft section adjacent to the screw tip section, and
providing the at least one first scraping edge with respect to the at least one second scraping edge at a distance from each other, such that the at least one first scraping edge and the at least one second scraping edge extend in an axial direction over different sections of the screw and such that mutually facing ends of the at least one first scraping edge and the at least one second scraping edge are arranged within the same thread turn.

19. A method of use of a screw, comprising:
providing a screw having a shaft section which extends axially, the screw having
a thread at the shaft section that extends radially starting from the shaft section,
a screw tip section which connects to the shaft section,
at least one first scraping edge at the screw tip section,
at least one second scraping edge in a region of the shaft section adjacent to the screw tip section, wherein the at least one first scraping edge and the at least one second scraping edge are at a distance from each other and extend in the axial direction over different sections of the screw, and mutually facing ends of the at least one first scraping edge and the at least one second scraping edge are arranged within the same thread turn,
introducing the screw in a manner without drilling a pilot hole, into a wood underground, and
applying a driving force to the screw.

* * * * *